2 Sheets—Sheet 1.

H. W. ATWATER.
Trap for Sewers, &c.

No. 214,984. Patented May 6, 1879.

Witnesses
Frank G. Parker.
C. H. Slade.

Inventor:
Henry W. Atwater
by Maynadier & Coale
his Attys.

N. PETERS, PHOTO-LITHOGRAPHER, WASHINGTON, D C.

UNITED STATES PATENT OFFICE.

HENRY W. ATWATER, OF NEWTON, MASSACHUSETTS.

IMPROVEMENT IN TRAPS FOR SEWERS, &c.

Specification forming part of Letters Patent No. 214,984, dated May 6, 1879; application filed March 22, 1879.

*To all whom it may concern:*

Be it known that I, HENRY W. ATWATER, of Newton, in the county of Middlesex and State of Massachusetts, have invented certain new and useful Improvements in Traps for Street-Sewers, Water-Closets, and the like, of which the following is a full, clear, concise, and exact description, reference being had to the accompanying drawings, making a part hereof, in which—

Figure 1:
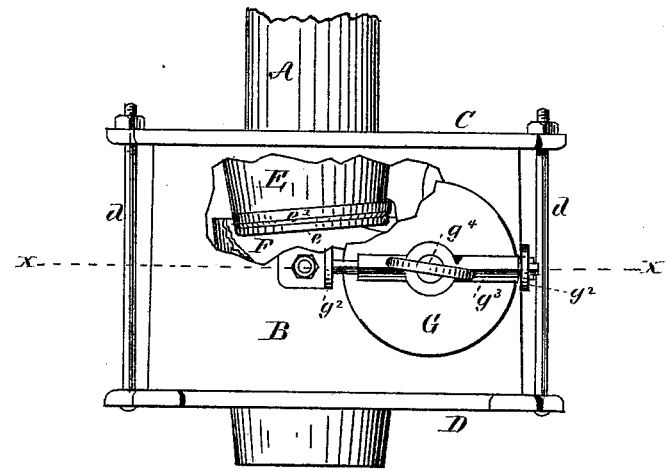
Figure 2:
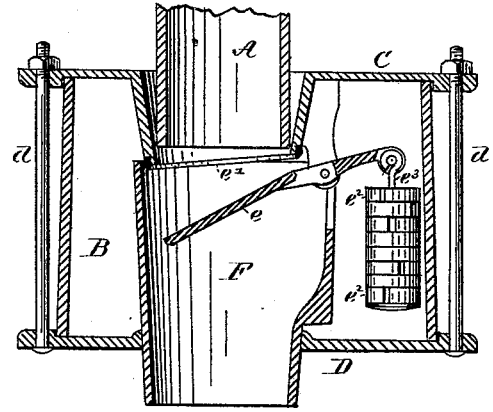

Figure 1 is an elevation of an appliance embodying my invention, part of the casing being broken away to show the interior construction, and Fig. 2 is a vertical section. The other figures show details, and will be referred to below.

The object of my invention is to prevent the sewer-gas from escaping through the pipes from the sewer or S traps; and the main part of my invention consists in a new form of trap composed of a casing with a top carrying the inlet-pipe and gate and a bottom having a chamber projecting up from it to be connected with the outlet-pipe, all as will now be more fully described.

In the drawings, A is the waste-pipe. B is the casing of my attachment. C is the top of the attachment, and D is its bottom. In the top C is a hole, from which projects downward a pipe, E, as shown. Into this pipe E the pipe A empties, and it is advisable to make the pipe E larger at the top than at the bottom, in order that a chamber may be formed, as shown in Fig. 2, around which cement may be placed, so as to form a gas-tight joint between A and E.

Figure 5:
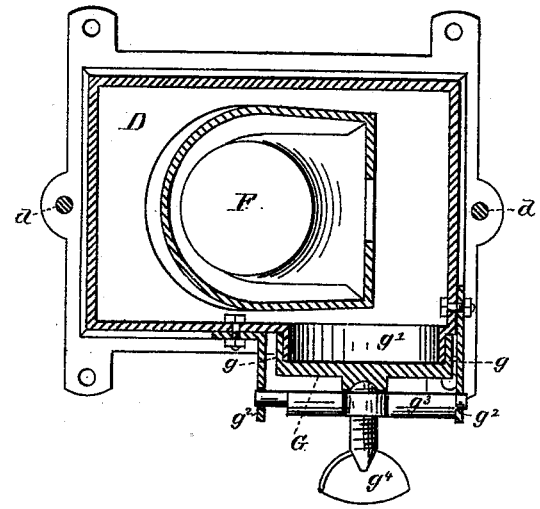

From the bottom D extends upward a chamber, F, into which the pipe E discharges, this chamber F discharging into a pipe leading into the sewer or S trap below. Hinged to the bottom of the pipe E is a gate, $e$, counterbalanced, so that a weight upon its top will cause it to open and allow whatever strikes upon it to fall into the chamber and outlet-pipe below, and the walls of the chamber should be high enough to catch all of the sewage which escapes from the pipe E, and should be of such a shape as not to interfere at all with the free swinging of the gate $e$. The best shape for the purpose is that shown in the drawings. (See Figs. 2 and 5.) I have found it best to slant the bottom of the pipe E, placing the hinge of the gate $e$ upon the shortest side of the pipe E, as shown, so that whatever falls on the gate will slide away from the hinge and not toward it to clog it. This attachment is held together by bolts $d\ d$, which, passing through the top C and bottom D, clamp the casing B between C and D, and the joints between the casing B and its top C and bottom D should be made gas-tight, either by grooves cut in C and D, into which the casing fits, as shown in the drawings, or by cement or in some other way.

Figure 4:
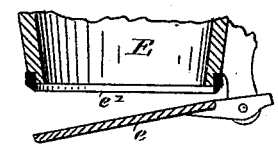

In order that the joint between the gate $e$ and the bottom of the pipe E may be gas-tight, I place a rubber ring, $e^1$, around the bottom of the pipe E, the ring being beveled on its lower edge, as shown in Fig. 4, so that when the gate bears against its lower edge it will be compressed, forming a joint which is tight in proportion to the weight of the counter-balance.

Figure 6:
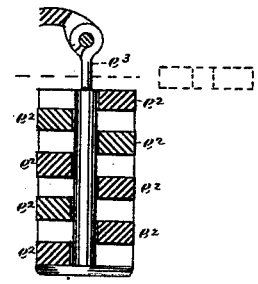
Figure 6:
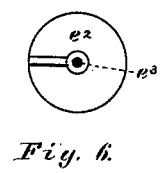

In order to regulate the counter-balance for the gate $e$, I use a number of weights, $e^2$, upon a rod, $e^3$, as will be readily understood from Figs. 2 and 6. By this means the weight of the counter-balance can be adjusted very accurately, a perfectly gas-tight joint being insured without greatly overbalancing the gate $e$.

In the side of the casing B is a man-hole for use in case the interior of my attachment needs repairing; and another part of my invention relates to an improved mode of fastening a cover on the man-hole.

Figure 3:
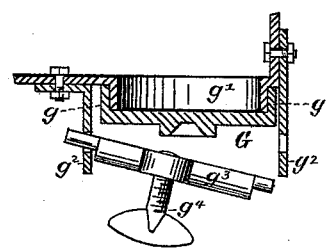

G is the cover, which is provided with a rim, $g$, which fits over a rim, $g^1$, on the casing around the man-hole. $g^2\ g^2$ are lugs attached to this casing, in which are holes, into which the ends of the cross-bar $g^3$ fits. This cross-bar is provided with a thumb-screw, $g^4$, which is adapted to bear against the center of the man-hole cover and hold it against the casing; and the chief novelty of this part of my invention consists in making this cross-bar a separate and distinct piece, so that it can be removed and the man-hole cover and man-hole gotten at with less trouble than if this cross-bar were a part of the cover. (See Fig. 3.)

In practice I always use cement or a washer of some kind in connection with this cover to insure a gas-tight joint between the cover and the casing.

My apparatus is very simple, and can be used, if desired, with each water-closet in a house; but I find that generally it is only necessary to use one in a house of ordinary size, that one being placed where the sewer-pipe leaves the house.

The size of my apparatus must, of course, depend upon the uses to which it is to be put, and it should always be supplied with sufficient water to thoroughly cleanse it.

What I claim as my invention is—

1. The trap above described, consisting of the top C, having the pipe E and gate $e$, the casing B, and the bottom D, having the chamber F projecting up from it, all as set forth.

2. In combination with the gate $e$ and pipe E, the rubber ring $e^1$, having its lower edge beveled, as and for the purposes set forth.

3. In combination, the pipe E, ring $e^1$, gate $e$, and adjustable counter-balance $e^2$ $e^3$, all as and for the purposes set forth.

4. In combination, the cover G, having the rim $g$, the rim $g^1$, and lugs $g^2$ $g^2$, with the removable bar $g^3$ and screw $g^4$, all as and for the purpose set forth.

HENRY W. ATWATER.

Witnesses:
GEORGE O. G. COALE,
C. H. SLADE.